United States Patent [19]

Yao

[11] Patent Number: 4,520,005
[45] Date of Patent: May 28, 1985

[54] METHOD OF MAKING A COMPOUND

[75] Inventor: Yung-Fang Y. Yao, Dearborn Heights, Mich.

[73] Assignee: Ford Motor Company, Dearborn, Mich.

[21] Appl. No.: 668,544

[22] Filed: Nov. 5, 1984

Related U.S. Application Data

[63] Continuation-in-part of Ser. No. 548,070, Nov. 2, 1983, abandoned.

[51] Int. Cl.$^3$ .............................................. C01G 45/12
[52] U.S. Cl. .................................................... 423/599
[58] Field of Search ......................... 423/599; 429/224

[56] References Cited

U.S. PATENT DOCUMENTS 3,579,452  5/1971  Hund .................................... 423/599

FOREIGN PATENT DOCUMENTS 2380224  10/1978  France ................................ 423/599

OTHER PUBLICATIONS

Mellor, "Inorganic and Theoretical Chemistry", vol. 12, Longmans, Green & Co., N.Y., 1932, pp. 274–280.

*Primary Examiner*—H. T. Carter
*Attorney, Agent, or Firm*—William E. Johnson; Olin B. Johnson

[57] ABSTRACT

This specification is directed to a method of making a compound selected from the group consisting of birnessite compounds of the formula $Bi_xMn_yO_{2y+1.5x} \cdot zH_2O$, wherein the y/x ratio is in a range of from about 7 to about 18 and the z/y ratio is in a range of from about 0.5 to about 0.6, $Pb_xMn_yO_{2y+x} \cdot zH_2O$, wherein the y/x ratio is in a range of from about 6 to about 10 and the z/y ratio is in a range of from about 0.5 to about 0.6, and manganese oxide compounds containing both of these compounds. The method is characterized by the following steps. A solution is formed by mixing $Mn(NO_3)_2$ with a nitrate of bismuth or lead or mixtures thereof. The solution is maintained at a relatively constant temperature and NaOH is added to the solution, whereby $Mn(OH)_2$ and a hydroxide of bismuth or lead or mixtures thereof form a suspension. While the suspension is being agitated, oxygen is passed through the suspension, whereby the $Mn(OH)_2$ and the hydroxide of bismuth or lead or mixtures thereof can react to form a compound. The suspension is filtered to recover the birnessite compound. Thereafter, the compound is washed with water and dried.

2 Claims, No Drawings

METHOD OF MAKING A COMPOUND

This application is a continuation-in-part of my prior application Ser. No. 548,070, filed Nov. 2, 1983 and now abandoned, entitled "Method of Making a Compound."

TECHNICAL FIELD

This application is directed to a method of making a compound and more particularly to a method of making a compound selected from the group consisting of birnessite compounds of the formula $Bi_xMn_yO_{2y+1.5x}\cdot zH_2O$, wherein the y/x ratio is in a range of from about 7 to about 18 and the z/y ratio is in a range of from about 0.5 to about 0.6, $Pb_xMn_yO_{2y+x}\cdot zH_2O$, wherein the y/x ratio is in a range of from about 6 to about 10 and the z/y ratio is in a range of from about 0.5 to about 0.6, and manganese oxide compounds containing both of these compounds. The compound has use in the manufacture of rechargeable manganese dioxide containing cells.

BACKGROUND AND PRIOR ART STATEMENT

No search was conducted on the subject matter of this specification in the U.S. Patent and Trademark Office or in any other search facility. In the prosecution of my aforementioned U.S. application Ser. No. 548,070, the U.S. Patent Office cited the following materials: U.S. Pat. No. 3,579,452; French Pat. No. 2,380,224; and pages 274–280 of a book entitled *Inorganic and Theoretical Chemistry*, Vol. 12, Longmans, Green & Co., N.Y., 1932. I am unaware of any other prior art more relevant to the subject matter of this specification.

Ford Motor Company, the assignee of this application, is also the assignee of two patent applications which deal with modified electrode materials for a rechargeable manganese dioxide cell. These applications are: "Rechargeable Manganese Dioxide Electrode Material-I", filed Aug. 8, 1983, Ser. No. 521,473; and "Rechargeable Manganese Oxide Electrode Materials", filed Aug. 8, 1983, Ser. No. 521,474. These two applications are hereby incorporated by reference.

Briefly, the first application is directed to an improved manganese dioxide electrode material, the material being one which may be cycled between discharged and charged states at higher utilization of reactant and for substantially greater number of cycles than previously known manganese dioxide electrode materials. The improved manganese dioxide electrode material is characterized in that a heavy metal selected from the group consisting of bismuth, lead, and mixtures of bismuth and lead is included in the electrode material by means of a chemical reaction.

The second application is directed to improved manganese oxide electrode materials. The manganese oxide electrode materials may be cycled between discharged and charged states at higher utilization of reactant and for a substantially greater number of cycles than previously known manganese dioxide electrode materials. The manganese oxide electrode materials are characterized in that a heavy metal selected from the group consisting of bismith, lead, and mixtures of bismuth and lead is included in the electrode material without initial reaction of the electrode components.

The method taught in application Ser. No. 521,473 for chemically incorporating bismuth, lead, and mixtures of bismuth and lead into the manganese dioxide electrode materials was a very cumbersome and expensive method. The purpose of this specification is to disclose and claim a relatively simple manner of making the improved manganese dioxide electrode material formed as a so-called "birnessite compound" and having a heavy metal selected from the group consisting of bismuth, lead, and mixtures of bismuth and lead chemically included therein.

The method illustrated in the application Ser. No. 521,473 for the manufacture of the compound $BiMn_xO_y$ was as follows.

The precursor $NaMn_xO_y\cdot ZH_2O$ was prepared according to the procedure given by Wadsley in JACS, Vol. 72, 1781 (1950), as follows. Solution A formed of 110 grams NaOH in 500 ml $H_2O$ was cooled in an ice bath before being added slowly into a solution B of 60 grams $Mn(NO_3)_2\cdot 6H_2O$ in 400 ml of water that was held at 3°–5° C. The $Mn(OH)_2$ that precipitated out was slowly oxidized by passing oxygen through a fritted glass tube into the solution still held at 3°–5° C. for five hours with agitation followed by standing overnight. The solid was suction filtered and was washed 10 times with distilled water. It was dried over a warm plate at approximately 50° C. for one day. The product was analyzed by ICP-AES and found to contain 48% Mn and 7.5% Na. An x-ray diffraction pattern showed that the major components are $(Na.Mn)_4.Mn_{12}O_{28}\cdot 8H_2O$, $Na_4Mn_{14}O_{27}\cdot 9H_2O$, (ASTM XRD file #4-0095 and #23-1045, respectively) and a minor amount of Hausmanite. The surface area was determined by Krypton adsorption as 50 m²/g.

The complex oxide, $BiMn_xO_y\cdot ZH_2O$, was prepared by an ion exchange method. This is the heavy metal (bismuth) containing manganese dioxide material to be used as the improved manganese dioxide electrode material. One gram of the precursor, as prepared above, was shaken in 10 ml of solution containing 1.46 grams $Bi(NO_3)_2\cdot 5H_2O$ (about five times of the stoichiometric amount required) for 16 hours. After exchange, the solid was filtered and repeatedly washed with distilled water. It was dried again at temperatures slightly above 50° C. The product thus prepared was found to contain 45.2% Mn, 15% Bi, and 0% Na. Its crystalline structure was identified by XRD as similar to that of Na-free birnessite (ASTM file #23-1239). The existence of this Bi-containing manganate (or birnessite) has not been previously reported in the literature. It is in this manner that the bismuth containing manganate compound was formed in order to make the rechargeable manganese dioxide electrode material which is described in that application in greater detail.

It is readily apparent that the above-described method of making a heavy metal/manganese dioxide compound was a very cumbersome and expensive one. It is a primary object of this invention to provide a relatively simple and efficient method of making a heavy metal/manganese dioxide birnessite compound which can be used as the electrode material in a rechargeable cell.

DISCLOSURE OF INVENTION

This invention is directed to a method of making a compound selected from the group consisting of birnessite compounds of the formula $Bi_xMn_yO_{2y+1.5x}\cdot zH_2O$, wherein the y/x ratio is in a range of from about 7 to about 18 and the z/y ratio is in a range of from about 0.5 to about 0.6, $Pb_xMn_yO_{2y+x}\cdot zH_2O$, wherein the y/x ratio is in a range of from about 6 to about 10 and the z/y ratio is in a range of from about 0.5 to about 0.6, and manganese oxide compounds containing both of the compounds and, more particularly, to a method of making a compound selected from the group consisting of birnessite compounds of the formula $Bi_xMn_yO_{2y+1.5x}\cdot zH_2O$, wherein the y/x ratio is in a range of from about 7 to about 18 and the z/y ratio is in a range of from about 0.5 to about 0.6, $Pb_xMn_yO_{2y+x}\cdot zH_2O$, wherein the y/x ratio is in a range of from about 6 to about 10 and the z/y ratio is in a range of from about 0.5 to about 0.6, and manganese oxide compounds containing both of the compounds and which have particular utility for use as a heavy metal containing manganese oxide birnessite compound as a cathode material for alkaline rechargeable batteries.

In accordance with the broad principles of the method of this invention, the method of making a compound selected from the group consisting of birnessite compounds of the formula $Bi_xMn_yO_{2y+1.5x}\cdot zH_2O$, wherein the y/x ratio is in a range of from about 7 to about 18 and the z/y ratio is in a range of from about 0.5 to about 0.6, $Pb_xMn_yO_{2y+x}\cdot zH_2O$, wherein the y/x ratio is in a range of about 6 to about 10 and the z/y ratio is in a range of from about 0.5 to about 0.6, and manganese oxide compounds containing both of the compounds, is characterized by having the following steps. A solution is formed by mixing $Mn(NO_3)_2$ with a nitrate of bismuth or lead or mixtures thereof. After formation of the solution, it is maintained at a relatively constant temperature. 5M Na(OH) solution is added to solution, whereby $Mn(OH)_2$ and a hydroxide of bismuth or lead or mixtures thereof form a suspension. The suspension is agitated. Oxygen is passed through the suspension while the suspension is being agitated, whereby $Mn(OH)_2$ and the hydroxide of bismuth or lead or mixtures thereof can react to form the desired burniessite compound in which Mn is oxidized to its higher valence state, 4+. Thereafter, the suspension is filtered to recover the desired birnessite compound. The recovered material is washed with water and dried in an air oven to produce the desired birnessite compound.

Another embodiment of the method of my invention teaches that after the recovered birnessite compound is washed with water it is washed with dilute acid to remove any Na remaining after washing as well as other nonreactive materials. This processing produces a finished birnessite compound which has slightly better characteristics when the compound is used as a cathode material for alkaline rechargeable batteries in that it can be discharged and recharged to a slightly greater extent than its nonacid washed form.

BEST MODE AND INDUSTRIAL APPLICABILITY

The novel features that are considered characteristic of the method of my invention are set forth with particularity in the appended claim. The invention itself, however, both as to its organization and its method of operation, together with additional objects and advantages thereof, will best be understood from the following description of specific examples.

The following description is what I consider to be preferred embodiments of the method of my invention. The following description also sets forth what I now contemplate to be the best mode of carrying out the method of my invention. The description is not intended to be a limitation upon the broader principles of this method.

EXAMPLE 1

Method of Making Bismuth Form of the Desired Compound 39.9 grams of $Mn(NO_3)_2$ solution (49.5% $Mn(NO_3)_2$ by weight) was mixed with 57 grams of 0.15 molar $Bi(NO_3)_3$ solution (sp. gr. 1.05) and diluted with 70 ml of water to make up solution A (Mn/Bi mole ratio=13.4). This solution was placed in a constant temperature bath maintained at 2° C. 70 ml of 5.5 molar NaOH solution was chilled in an ice bath and then was added slowly into solution A with constant stirring. The resulting suspension was oxidized with oxygen dispersed through a fritted glass candle for 22 hours. The slurry was then filtered and washed repeatedly with distilled water. About half of the filtered cake was taken out at this point and dried in an oven at 54° C. for one day to give a sample $Bi_xMn_yO_{2y+1.5x}\cdot 0.6_yH_2O$ The remaining part of the filtered cake was further washed with a dilute acid of pH 1–2 for three times followed by a water rinse and drying at 54° C. for one day to give another sample of $Bi_xMn_yO_{2y+1.5x}\cdot 0.6_yH_2O$ (Mn/Bi mole ratio or y/x ratio=14.6 with recovery of bismuth).

Each of the two so-formed compounds were used to form alkaline rechargeable batteries in the same manner. The compound to be tested was first milled in a micromill. A weighed mixture of the compound and graphite powder at weight ratio of 1:2 was milled again for two minutes to ensure homogeneous mixing. The mixture was pressed at a pressure of about 10 tons into pellets of 1–1.2 cm diameter and 0.2–0.3 mm thickness. The pellet was weighed (usually 0.02–0.04 grams) and placed between a cathode gold disc current collector and a suitable separator material. The pellet was held in place by a screwed-down Teflon plug. Platinum wire was used as a counter-electrode. About 20 ml of 9M KOH solution was used as the electrolyte. An HgO/Hg reference electrode was connected to the cell through a thin polyethylene tube. The cell was discharged and charged at constant current of 1 ma/0.02 grams of the total weight of the pellet. The cell voltage versus HgO/Hg electrode and current were continuously recorded with a recorder. The discharge and charge was cycled between preset cell charge and discharge voltages of 0.5 V and minus 0.5 V versus the HgO/Hg reference electrode.

The acid washed birnessite compound had excellent rechargeable characeristics in that after 60 cycles it was still capable of approximately 55% discharging and recharging of its total electrical capacity (2e⁻ per Mn), which is substantially beyond known rechargeable materials which fall to 10–15% of total capacity after a mere 15 or 20 discharges and recharges. The nonacid washed birnessite compound was not quite as good as the acid washed material in that its total discharge and recharge capacity at 60 cycles was approximately 45–48%.

EXAMPLE 2

The same procedure as set forth in Example 1 was carried out, except that the Mn/Bi mole ratio in the starting salt solution was changed to 21.4 as compared to a ratio of 13.4 in the first example. The Mn/Bi mole ratio, or y/x ratio for the birnessite compound, in the final product was 17.1, again total recovery of bismuth. This material also demonstrated excellent rechargeable characteristics when used as a cathode material for an alkaline rechargeable battery.

EXAMPLE 3

The same procedure as set forth in Example 1 was carried out again, except that the Mn/Bi mole ratio in the starting salt solution was changed to 10.7. Part of the filtered cake material was dried at 45° C. and part was dried at 58° C. The Mn/Bi mole ratio, or y/x ratio for the birnessite compound, in this product was 8.7. Both of these materials worked well as a cathode material for an alkaline rechargeable battery. In both cases the materials had better than 65% of their capacity usable in both discharge and recharge thereof after approximately 30 cycles.

EXAMPLE 4

The same procedure as set forth in Example 1 was again carried out, except that the Mn/Bi mole ratio in the starting solution was 14.9 and the precipitation and oxidation by oxygen to form the birnessite compound was carried out in a bath maintained at 25° C. instead of 2° C. Also, part of the slurry was oxidized for only five hours in order to oxidize the manganese to a higher valence state and the other part was oxidized for a period of 23 hours. The carrying out of the precipitation at the higher temperature and the reduced time for oxidizing the manganese to its higher valence state did not appear to have any effect on the birnessite compound when it was used as a rechargeable electrode material in the alkaline rechargeable battery. In fact, this material had almost 50% of its rechargeable capabilities after 60 cycles.

EXAMPLE 5

The same procedure as set forth in Example 4 was repeated, except that the Mn/Bi mole ratio in the starting solution was 16.8 and the addition of sodium hydroxide solution was slowed down to 2 ml/min (versus 10 ml/min in the other examples). The Mn/Bi mole ratio, or y/x ratio for the birnessite compound, in the final product was 15.5. Once again, the resulting birnessite compound worked extremely well as a rechargeable cathode material for an alkaline battery. It had a rechargeability of about 45% of its total capacity at 60 cycles.

EXAMPLE 6

3.84 grams of $Pb(NO_3)_2$ were dissolved in 135 ml of distilled water. To this solution, 28.5 grams of $Mn(NO_3)_2$ solution (49.5 weight percent) was added. The coprecipitation/oxidation occurred at near 0° C. The remaining procedures that were carried thereon were as set forth in Example 1 for filtration, washing, and drying of the birnessite compound which was produced. The compound $Pb_xMn_yO_{2y+x}\cdot 0.6_yH_2O$ produced (Mn/Pb mole ratio or y/x ratio=7.4) proved to be an acceptable material for use as a cathode material for alkaline rechargeable batteries. After 30 cycles, the material had better than 30% of its discharge/recharge capabilities remaining.

EXAMPLE 7

The same procedure as set forth for Example 6 was repeated, except that the coprecipitation/oxidation was carried out at 25° C. Once again, the resulting birnessite mateiral was suitable for use as a cathode material for an alkaline rechargeable battery.

The compounds thus prepared were examined in detail by TEM and XRD for their crystalline structure, elemental analysis for Bi, Mn, Pb and Na content, DTA and dehydration test for water, and SEM for Bi distribution relative to Mn. Their surface areas were measured by Kr A adsorption. The results show that the Bi or Pb manganate thus prepared are the same in structure as that prepared by the two-step method - Na/birnessite preparation followed by ion-exchange. That is, thin layer structure similar to the compound known as synthetic 7-A birnessite or 7-A manganate. The 4+ valent state of Mn was deduced from the discharge/charge capacity of $1.9e^{31}$ /Mn obtained on these compounds.

The results from the following examples clearly illustrate the following.

1. The bismuth and lead containing birnessite compounds prepared by the method of my invention are better than the conventional electrolyte $MnO_2$ in utilization, rechargeability, and cycle life when used as a cathode material for an alkaline rechargeable battery. They also surpass the compounds prepared by the previous two-step method which was illustrated in the previously mentioned patent application.

2. The compounds prepared by my method are, in general, the same composition and crystalline structure as those compounds prepared by the two-step method. However, the compounds prepared by my method are more finely divided and less crystalline. These birnessite compounds may be identified by their x-ray patterns as set forth in ASTM Standard 23-1045 and 23-1234.

3. Removal of sodium and other forms of manganese oxides such as MnOOH, by washing with dilute acid, appear to be beneficial for the birnessite compound preparations.

4. The birnessite compounds prepared by my method in which the coprecipitation/oxidation is carried out at 25° C. are the same as those carried out near 0° C.

5. The variation of the ratio of Mn/Bi in a range from about 7 to about 18 and the ratio of Mn/Pb in a range from about 6 to about 10 results in acceptable electrochemical activity of the so-produced material.

It is thus readily apparent that the method of my invention for preparing the birnessite compounds is easier, more reliable, and relatively inexpensive to carry out than the procedures formerly required in the two-step method.

While particular embodiments of the method of my ivnention have been illustrated and described, it will be obvious to those skilled in the art that various changes and modifications may be made without departing from the invention, and it is intended to cover in the appended claims, all such modifications and equivalents as fall within the true spirit and scope of this invention.

I claim:

1. A method of making a compound selected from the group consisting of birnessite compounds of the formula $Bi_xMn_yO_{2y+1.5x}\cdot zH_2O$, wherein the y/x ratio is in a range of from about 7 to about 18 and the z/y ratio is in a range of from about 0.5 to about 0.6, $Pb_xMn_yO_{2y+x}\cdot zH_2O$, wherein the y/x ratio is in a range of from about 6 to about 10 and the z/y ratio is in a range of from about 0.5 to about 0.6, and manganese oxide compounds containing both of these compounds, characterized by the steps of:

forming a solution by mixing $Mn(NO_3)_2$ with a nitrate of bismith or lead or mixtures thereof;

maintaining said solution at a relatively constant temperature;

adding NaOH to said solution, whereby Mn(OH)$_2$ and a hydroxide of bismuth or lead or mixtures thereof form a suspension;

agitating said suspension;

passing oxygen through said suspension while said suspension is being agitated, whereby said Mn(OH)$_2$ and said hydroxide of bismuth or lead or mixtures thereof can react to form a compound selected from the group consisting of birnessite compounds of the formula $Bi_xMn_yO_{2y+1.5x} \cdot zH_2O$, wherein the y/x ratio is in a range of from about 7 to about 18 and the z/y ratio is in a range of from about 0.5 to about 0.6, $Pb_xMn_yO_{2y+x} \cdot zH_2O$, wherein the y/x ratio is in a range of from about 6 to about 10 and the z/y ratio is in a range of from about 0.5 to about 0.6, and manganese oxide compounds containing both of these compounds;

filtering said suspension to recover said birnessite compound;

washing said recovered birnessite compound with water; and drying said washed birnessite compound.

2. The method of claim 1, wherein said filtered birnessite compound is washed with a dilute acid before being dried.

* * * * *